May 2, 1967  N. C. HARRISON, JR  3,317,004
SAFETY DEVICE FOR A VEHICLE LIFT
Filed Jan. 14, 1966

INVENTOR.
NELSON C. HARRISON, JR.
BY John R. Walker, III
ATTORNEY

May 2, 1967 N. C. HARRISON, JR 3,317,004
SAFETY DEVICE FOR A VEHICLE LIFT
Filed Jan. 14, 1966 2 Sheets-Sheet 2
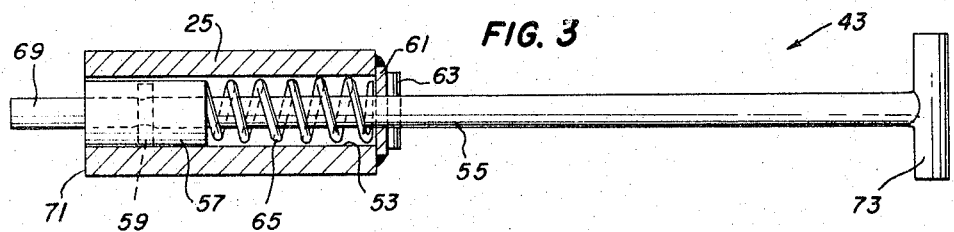
FIG. 3
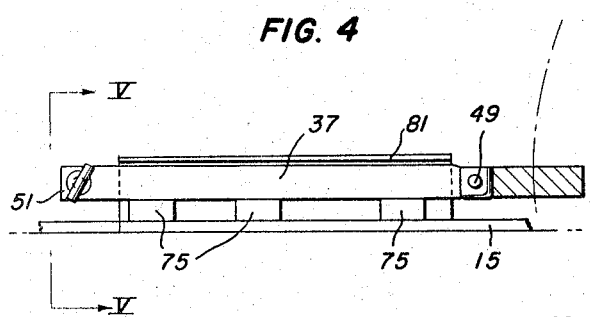
FIG. 4
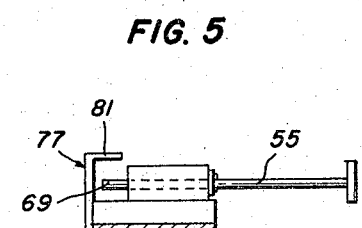
FIG. 5
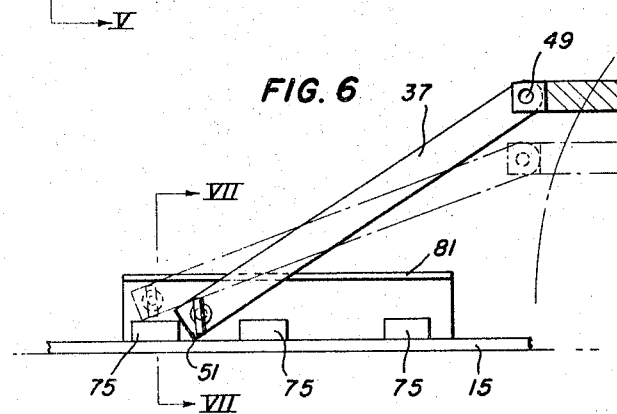
FIG. 6
FIG. 8
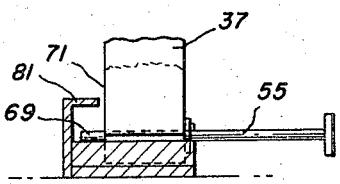
FIG. 7
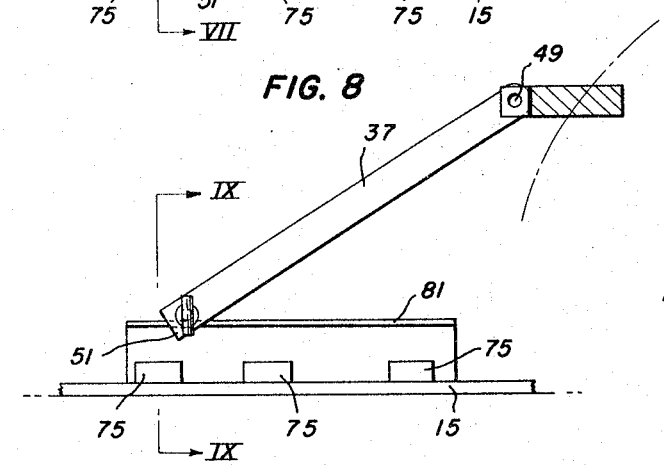
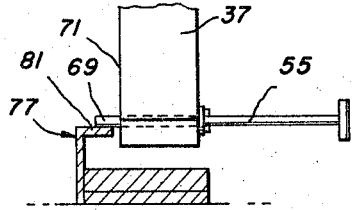
FIG. 9
INVENTOR.
NELSON C. HARRISON, JR.
BY John R. Walker, III
Attorney United States Patent Office 3,317,004
Patented May 2, 1967

3,317,004
SAFETY DEVICE FOR A VEHICLE LIFT
Nelson C. Harrison, Jr., Memphis, Tenn., assignor to Dover Corporation, New York, N.Y.
Filed Jan. 14, 1966, Ser. No. 520,611
6 Claims. (Cl. 187—8.5)

This invention relates to a safety device for preventing accidental lowering of a vehicle lift of the type which is generally referred to as a portable lift.

In vehicle lifts of the above-mentioned type there is generally provided a base, which may or may not be fixedly attached to a supporting floor, a superstructure that contacts the undersurfaces of the vehicle for the lifting thereof, and a parallelogram type of mechanism which supports the superstructure and which is actuated by a piston-cylinder assembly to move the superstructure in an arc relative to the base and parallel to the base between raised-rearward and lowered-forward positions relative to the base.

It will be understood that if adequate safeguards are not provided, there is the inherent danger in vehicle lifts of the above-mentioned type that the superstructure will accidentally be lowered, as for example, if a hydraulic line to the piston-cylinder assembly was accidentally ruptured, or if the control valve to the lift was defective or if it was inadvertently moved to lower the lift by one person when another was working beneath the lift.

Thus, one of the objects of the present invention is to provide a safety device for preventing the accidental lowering of the superstructure of vehicle lifts of the above-mentioned type.

A further object is to provide such a safety device that is easy to operate and is semi-automatic in operation.

A further object is to provide such a safety device that includes an inclined safety leg that co-acts with a ratchet-like engagement means mounted on the base to permit raising of the superstructure but prevents accidental lowering thereof.

A further object is to provide such a safety device that includes a track fixedly mounted relative to the base and holding means attached to the safety leg adapted for selective movable engagement with the track for holding the lower end of the safety leg in a position away from the ratchet-like engagement means and permit the safety leg to move and the superstructure to be lowered.

A further object is to provide such an arrangement of the parts and relative lengths thereof so that just before the superstructure reaches a completely lowered position, the above-mentioned holding means rides off the end of the track and permits the safety leg to automatically drop into a position ready for the next raising operation and without any subsequent intervening operation by the lift operator.

A further object is generally to improve the design and construction of safety devices for vehicle lifts.

The means by which the foregoing and other objects of the present invention are accomplished and the manner of their accomplishment will be readily understood from the following specification upon reference to the accompanying drawings, in which:

FIG. 3 is an elevational view of the holding means for selectively holding the lower end of the safety leg away from the ratchet-like engagement means and with the safety leg being shown in cross-section.

FIG. 4 is a side elevational view of the safety device of the present invention and with only a portion of the superstructure being shown (in cross-section) and with the parts being in the position shown when the superstructure is completely lowered.

FIG. 5 is a sectional view taken as on the line V—V of FIG. 4.

FIG. 6 is a view similar to FIG. 4 showing in broken lines the position of the parts when the superstructure is partially raised and in solid lines when the superstructure is raised further and the safety leg is engaged behind one of the blocks to prevent accidental lowering of the superstructure.

FIG. 7 is a sectional view taken as on the line VII—VII of FIG. 6.

FIG. 8 is a view similar to FIG. 6 but showing the parts when the lower end of the safety leg is in an upper position being held away from the ratchet-like engagement means, as when the superstructure is being lowered.

FIG. 9 is a sectional view taken as on line IX—IX of FIG. 8.

Figure 1:
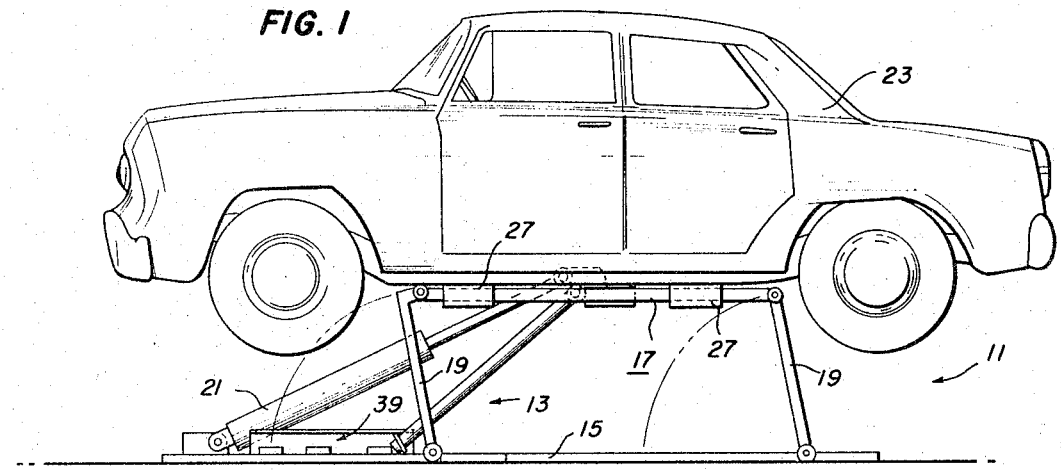
FIG. 1 is a side elevational view showing the safety device of the present invention in conjunction with a vehicle lift and showing a vehicle being lifted thereby.
Figure 2:
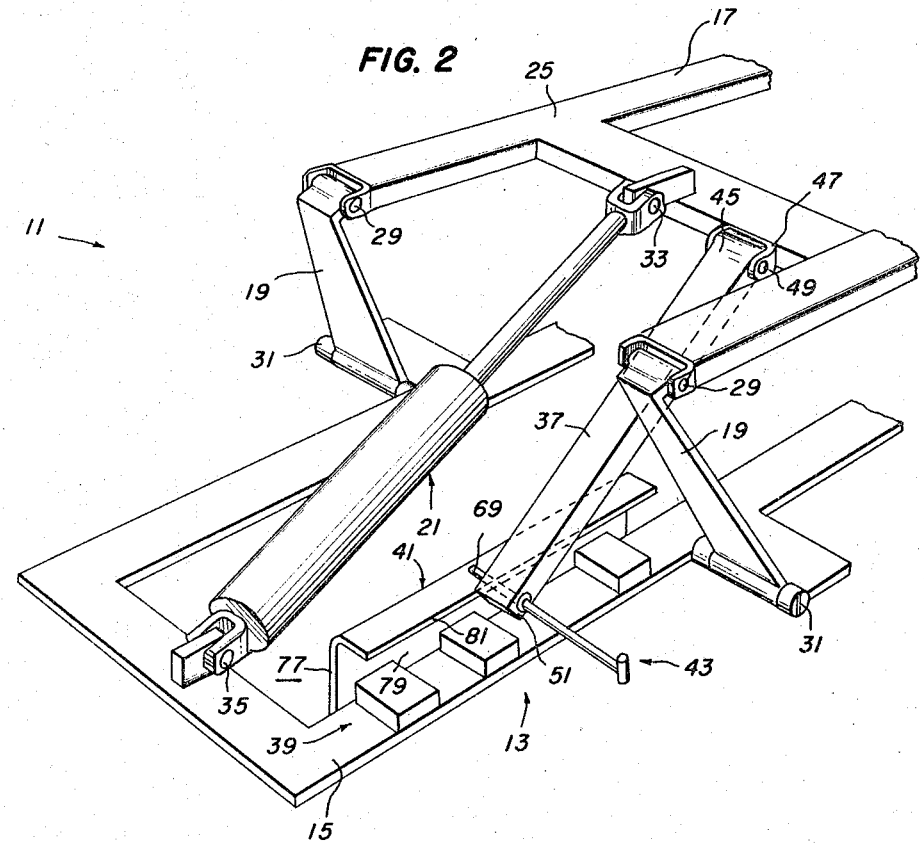
FIG. 2 is a fragmentary perspective view of a portion of the vehicle lift of FIG. 1, with parts removed for purposes of clarity or simplicity.

Referring now to the drawings in which the various parts are indicated by numerals, and referring first to FIGS. 1 and 2 wherein is shown a typical vehicle lift 11 of the type with which the safety device 13 of the present invention is particularly adapted to be incorporated, the vehicle lift 11 comprises in general a base 15, a superstructure 17 movably supported by four legs 19, and a piston-cylinder assembly 21 for actuating the vehicle lift. For purposes of clarity and not by way of limitation, the terms "forward" and "rearward" will be applied to the vehicle lift 11 in the manner in which the vehicle 23 is supported thereon, as seen in FIG. 1. Thus, the end of the vehicle lift 11 to the left, as viewed in FIG. 1, will be termed the forward end thereof, and the end to the right as viewed in this figure will be termed the rearward end thereof.

Referring now in more detail to vehicle lift 11, superstructure 17 is of any suitable construction for supporting the vehicle 23, and includes, for example, the H-frame 25, best seen in FIG. 2. Slidable base members 27, which have been omitted from FIG. 2 for purposes of simplicity are preferably provided on H-frame 25. Suitable vehicle engaging means known to those skilled in the art, as for example, swinging arms (not shown) having pads mounted thereon, are preferably provided on base members 27. It will be understood that superstructure 17 can be of any type desired without departing from the spirit and scope of the present invention.

Each of the legs 19 is pivotally mounted adjacent the upper end thereof to H-frame 25 as at 29 and pivotally mounted adjacent the lower end thereof to base 15 as at 31. It will be understood that with the use of this parallelogram mechanism, when the superstructure 17 is moved between lowered and raised positions, the superstructure will remain in a horizontal position and will move in an arc relative to base 15 as illustrated in broken lines in FIG. 1. In other words, in the raising of the superstructure 17, it moves upwardly and rearwardly while remaining horizontal, and in the lowering thereof it moves downwardly and forwardly while remaining horizontal. The piston-cylinder assembly 21 is pivotally connected adjacent the opposite ends thereof as at 33, 35, respectively, to the superstructure 17 and base 15 in the usual manner so that extension of the piston-cylinder assembly causes superstructure 17 to be raised and retraction of the piston-cylinder assembly causes the superstructure to be lowered. The hydraulic connections to the piston-cylinder assembly and other details of the vehicle lift 11 have been omitted since they may be of any suitable construction well-known to those skilled in the art.

Referring now to the safety device 13 of the present invention, the safety device comprises in general a rigid safety leg 37, ratchet-like engagement means 39 for co-action with the safety leg, a track 41 fixedly mounted relative to base 15, and holding means 43 attached to safety leg 37 and adapted for selective movable engagement with track 41 for holding the lower end of the safety leg away from ratchet-like engagement means 39 when it is desired to lower the superstructure.

Referring now in more detail to the various components of safety device 13, safety leg 37 is pivotally attached adjacent the upper end 45 thereof to the cross member of H-frame 25 by suitable means as a bracket 47 fixed to the cross member and a pin 49 extending horizontally through aligned apertures in the bracket and upper end 45. The lower distal end 51 of safety leg 37 is unattached and is provided with a substantially horizontal bore opening 53. Holding means 43 is mounted in bore 53 and comprises an elongated pin 55 that extends through the bore and out the opposite end thereof and which is slidably mounted in the bore by means of a sleeve 57. Pin 55 extends through the center of sleeve 57 and is attached thereto as by means of a small pin 59. An annular member 61 is fixedly attached to safety leg 37 at one end of bore 53 and pin 55 slidably extends through the center thereof. Another small pin 63 is mounted in a transverse bore in pin 55 on the outside of annular member 61 to act as a stop to limit movement of pin 55 to the left, as viewed in FIG. 3. A coil spring 65 is mounted around pin 55 and extends between annular member 61 and sleeve 57 to urge the pin 55 to the left as viewed in FIG. 3, which is its extended position and in which position the end portion 69 of pin 55 extends beyond the side 71 of safety leg 37. Adjacent the opposite end of pin 55 from end portion 69 is provided a handle 73 whereby the pin 55 may be pulled to the right as viewed in FIG. 3 to retract the end portion 69 into the bore 53 for a purpose later to be described.

Ratchet-like engagement means 39 preferably comprises a plurality of blocks 75 fixedly mounted on base 15 and spaced fore and aft relative to vehicle lift 11 in alignment with safety leg 37.

Track 41 preferably comprises an angle member 77 which is fixedly attached to base 15 adjacent the lower edge of the vertical flange 79 thereof. Angle member 77 additionally includes a substantially horizontal flange 81 integrally attached along the upper edge of vertical flange 79 and extending laterally over a portion of blocks 75 and spaced thereabove, as best seen in FIGS. 5, 7 and 9. Horizontal flange 81 is to the side of safety leg 37 as best seen in the above-mentioned figures and is in a position to be engaged by the end portion 69 of pin 55 when the pin is in said extended position as will be better understood in the description of the operation of the device to follow.

In describing the operation of the safety device 13 of the present invention, it is assumed that the vehicle lift 11 is in a lowered position with superstructure 17 adjacent base 15. Thus, the parts are as shown in FIGS. 4 and 5, wherein it will be seen the safety leg 37 is resting on top of blocks 75 in a substantially horizontal position with the distal end 51 projecting beyond the forward end of angle member 77. It will be noted that the pin 55 is in its normal extended position and is also beyond the end of angle member 77. Starting with the parts in the above-described position, the piston-cylinder assembly 21 is actuated to raise superstructure 17 which pulls upper end 45 of safety leg 37 rearwardly and upwardly thereby dragging lower distal end 51 over the forwardmost block 75, as viewed in broken lines in FIG. 6. Continued upward movement of superstructure 17 will cause the distal lower end 51 to be pulled rearwardly of said forwardmost block as shown in solid lines in FIG. 6, whereupon it will be understood that the superstructure could be stopped in this poistion so that the forwardmost one of blocks 75 would act to stop or brace the superstructure and prevent accidental lowering thereof. If it is desired to move superstructure 17 to greater heights, it will be understood that other of the blocks 75 could be engaged by the distal end 51 and be effective to limit accidental lowering of the superstructure. The position of the lower distal end 51 hereinabove described in which it is contigous base 15, for purposes of clarity will be herein termed its lower position.

When it is desired to lower the superstructure 17, the distal lower end 51 of safety leg 37 is moved from said lower position to an upper position, as shown in FIGS. 8 and 9 in which position end portion 69 overlies flange 81 and is in engagement with the upper surface thereof. It will be understood that distal end 51 may be moved to said upper position simply by manually pulling on handle 73 to retract end portion 69 while at the same time moving the distal end 51 upwardly. Then, the handle 73 is released and the end portion 69 allowed to come to rest on the top surface of horizontal flange 81. It will further be understood that superstructure 17 can be lowered then since distal end 51 is held out of engagement with the engagement means 39 while the end portion 69 slides forwardly along horizontal flange 81. This will continue until just before the superstructure 17 is completely lowered and at which time the end portion 69 will drop off the forward end of horizontal flange 81 into said lower position ready for the next raising of the superstructure 17.

From the foregoing, it can be seen that a very effective and safe means is provided for preventing accidental lowering of a vehicle lift superstructure. In addition, it will be seen that such means is provided which is semi-automtic in that once the safety device 13 has been manually released for lowering of the superstructure, it is not necessary for the lift operator to subsequently re-set the device for lifting. Thus, there is no chance for the operator to forget to put the safety device in its active lower position.

Although the invention has been described and illustrated with respect to a preferred embodiment thereof, it is to be understood that it is not to be so limited since changes and modifications may be made therein which are within the full intended scope of this invention as hereinafter claimed.

I claim:

1. In a vehicle lift of the type including a base, a superstructure, and means for moving said superstructure in an arc relative to said base and uparallel to said base between raised-rearward and lowered-forward positions relative to said base; a safety device for said vehicle lift comprising an inclined safety leg having an upper end and a lower end, means pivotally attaching said safety leg adjacent said upper end thereof to said superstructure with said safety leg extending forwardly and downwardly to its termination at said lower end, said distal lower end of said safety leg being movable between an upper position and a lower position, ratchet-like engagement means for co-action with said distal lower end of said safety leg when in said lower position to permit said lower end of said safety leg to move rearwardly when said vehicle lift is moved towards rearward-raised positions and to stop said lower end of said safety leg in its forward movement when said vehicle lift is urged towards forward-lowered positions whereby said safety leg permits raising of said superstructure but prevents accidental lowering thereof, a track fixedly mounted relative to said base, holding means attached to said safety leg and adapted for selective movable engagement with said track for holding said lower end of said safety leg in said upper position away from said ratchet-like engagement means to permit said safety leg to move forwardly and said superstructure to be lowered.

2. The device according to claim 1 in which the length of said track and the place of its termination in a forward end thereof is such that in the movement of said superstructure towards a lowered position when said lower distal end of said safety leg is in said upper position and just before said superstructure reaches a completely lowered position, said holding means is positioned to ride off said forward end of said track and permit said distal end of said safety leg to drop into said lower position.

3. The device according to claim 1 in which said ratchet-like engagement means comprises a plurality of blocks mounted on said base and spaced fore and aft relative to said vehicle lift.

4. The device according to claim 1 in which said track comprises an angle member having a substantially horizontal flange above said engagement means and with which said holding means is movably engaged when said lower end of said safety leg is in said uppper position.

5. The device according to claim 1 in which said safety leg is provided with a horizontal bore opening therethrough and in which said holding means comprises a pin, means slidably mounting said pin in said bore for endwise movement therein between extended and retracted positions, spring means engaging said pin and urging said pin into said extended position in which the end of said pin extends beyond the side of said safety leg; when said lower end of said safety leg is in said lower position, said pin when in said extended position being below said track; when said lower end of siad safety leg is in said upper position, said pin when in said extended position being above said track for sliding engagement therewith; and handle means on said pin for moving said pin to a retracted position out of the way of said track whereby said lower end of said safety leg can be moved between said lower and upper positions.

6. In a vehicle lift of the type including a base, a superstructure, and means for moving said superstructure in an arc relative to said base and parallel to said base between raised-rearward and lowered-forward positions relative to said base; a safety device for said vehicle lift comprising an inclined safety leg having an upper end and a lower end, means pivotally attaching said safety leg adjacent said upper end thereof to said superstructure with said safety leg extending forwardly and downwardly to its termination at said lower end, said distal lower end of said safety leg being movable between an upper position and a lower position, ratchet-like engagement means including a plurality of blocks mounted on said base and spaced fore and aft relative to said vehicle lift for co-action with said distal lower end of said safety leg when in said lower position to permit said lower end of said safety leg to move rearwardly when said superstructure is moved towards rearward-raised positions and to stop said lower end of said safety leg in its forward movement when said superstructure is urged towards forward-lowered position whereby said safety leg permits raising of said superstructure but prevents accidental lowering thereof, a track fixedly mounted relative to said base and comprising an angle member having a substantially horizontal flange above said engagement means, said safety leg being provided with a horizontal bore opening therethrough adjacent said lower end, holding means attached to said safety leg and adapted for selective movable engagement with said flange for holding said lower end of said safety leg in said upper position away from said ratchet-like engagement means and permitting said safety leg to move forwardly and said superstructure to be lowered, said holding means comprising a pin, means slidably mounting said pin in said bore for endwise movement therein between extended and retracted positions, spring means engaging said pin and urging said pin into said extended position in which the end of said pin extends beyond the side of said safety leg; when said lower end of said safety leg is in said lower position, said pin when in said extended position being below said flange; when said lower end of said safety leg is in said upper position, said pin when in said extended position being above said flange for sliding engagement therewith; handle means on said pin for moving said pin to a retracted position out of the way of said flange whereby said lower end of said safety leg can be moved between said lower and upper positions; said horizontal flange being of such a length that when said lower distal end of said safety leg is in said upper position and in the movement of said superstructure towards a lowered position and just before said superstructure reaches a completely lowered position, said pin is positioned to ride off said forward end of said horizontal flange and permits said distal end of said safety leg to drop into said lower position.

References Cited by the Examiner

UNITED STATES PATENTS

| | | | |
|---|---|---|---|
| 650,629 | 5/1900 | Brown | 254—10 |
| 1,275,381 | 8/1918 | Butler et al. | 187—8.49 |

WILLIAM FELDMAN, *Primary Examiner.*

OTHELL M. SIMPSON, *Examiner.*